Sept. 15, 1953  M. L. ANTHONY ET AL  2,652,542
ELECTROMECHANICAL FILTER
Filed Dec. 14, 1948  3 Sheets—Sheet 1

INVENTORS.
Myron L. Anthony
Robert M. Virkus
BY
Foorman L. Mueller
Atty.

Sept. 15, 1953    M. L. ANTHONY ET AL    2,652,542
ELECTROMECHANICAL FILTER
Filed Dec. 14, 1948    3 Sheets-Sheet 2
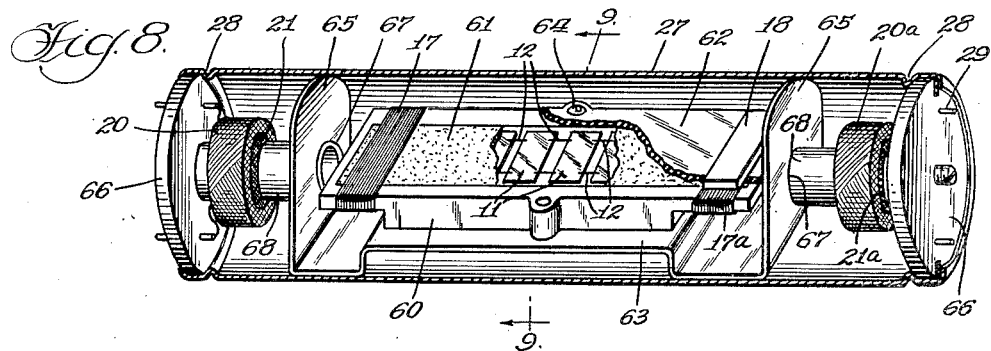
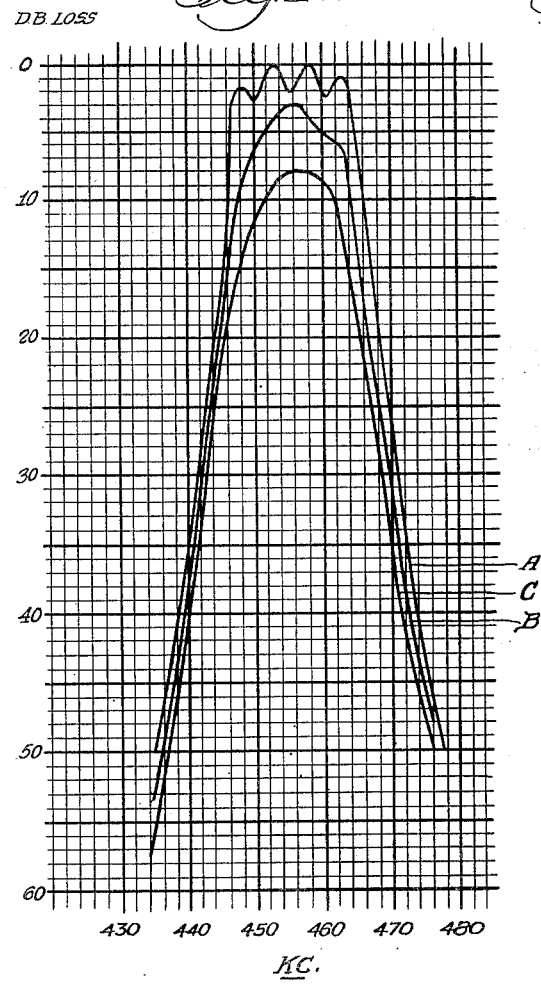
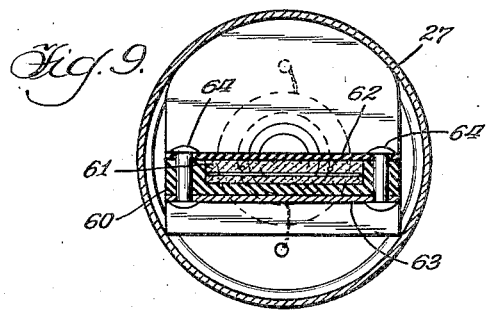
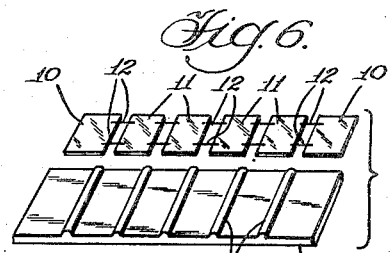
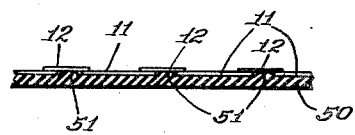
INVENTORS.
Myron L. Anthony
Robert M. Virkus
BY
Foorman L. Mueller
Atty Patented Sept. 15, 1953

2,652,542

UNITED STATES PATENT OFFICE 2,652,542

ELECTROMECHANICAL FILTER

Myron L. Anthony and Robert M. Virkus, La Grange, Ill., assignors to Motorola, Inc., Chicago, Ill., a corporation of Illinois Application December 14, 1948, Serial No. 65,253

9 Claims. (Cl. 333—71)

This invention relates generally to frequency selective circuit components and more particularly to an electromechanical filter suitable for use at medium and high radio frequencies.

In the prior art electrical filter circuits have been generally used to provide frequency selection in radio and related high frequency applications. Mechanical wave filters have also been used to some extent, particularly at audio frequencies and to some extent at medium frequencies. However, the prior units have not been entirely satisfactory, first because the mechanical structures thereof are difficult to manufacture in large quantities with the required tolerances, and second because the output response characteristics of the filters have not completely fulfilled the desired requirements.

It is, therefore, an object of the present invention to provide an improved compact electromechanical filter structure.

A further object of this invention is to provide an electromechanical filter for providing high selectivity at medium and high frequencies.

Another object of this invention is to provide an electromechanical filter the response of which provides high selectivity without producing undesired "ringing" in the circuits in which it is used.

A still further object of this invention is to provide an electromechanical filter structure including damping means for controlling the response characteristics of the filter.

A feature of this invention is the provision of an electromechanical filter including a plurality of mechanically coupled vibrating elements with driving means and matching coils all constructed as a compact unit.

Another feature of this invention is the provision of an electromechanical filter including a plurality of coupled plates the individual characteristics of which are selected so that the filter has a desired overall response characteristic.

A further feature of this invention is the provision of an electromechanical filter including a plurality of mechanically coupled plates and damping means engaging the plates for controlling the response characteristics of the filter.

Still another feature of this invention is the provision of a filter and damping means therefor including adjustable means for controlling the amount of damping.

A still further feature of this invention is the provision of a filter and a housing therefor adapted to contain liquid damping material surrounding the filter structure.

Further objects, features and advantages will be apparent from a consideration of the following description when taken in connection with the accompanying drawings in which:

Figs. 6 and 7 illustrate a modified damping structure for the assembly of Fig. 1;

Fig. 8 is a perspective view partly in section of a modified filter structure;

Fig. 9 is a cross-sectional view along the lines 9—9 of Fig. 8;

Fig. 10 is a curve chart illustrating the band pass characteristics of the filter;

In practicing the invention there is provided an electromechanical filter comprising a plurality of plates having the same mechanical resonant frequency, mechanically interconnected by fine wires so that vibrations are transmitted from plate to plate. The end plates of the filter are made of magnetostrictive material and are placed in fields produced by permanent magnets and coils. The coils are connected to matching transformers for coupling the same in high impedance circuits. A shielding structure is provided between the driving and pickup coils of the assembly and about the compact filter structure to form a housing for the entire filter assembly. The response characteristics of the filter may be controlled by the selection of the band pass characteristics of the individual sections and/or by damping of the plates and coupling wires. The plates and coupling wires may be damped by sheets of resilient material or by relatively heavy liquid. Adjustable means are provided for varying the pressure on the damping material so that the damping provided thereby may be altered to provide the required response characteristics in the filter.

Figure 1:
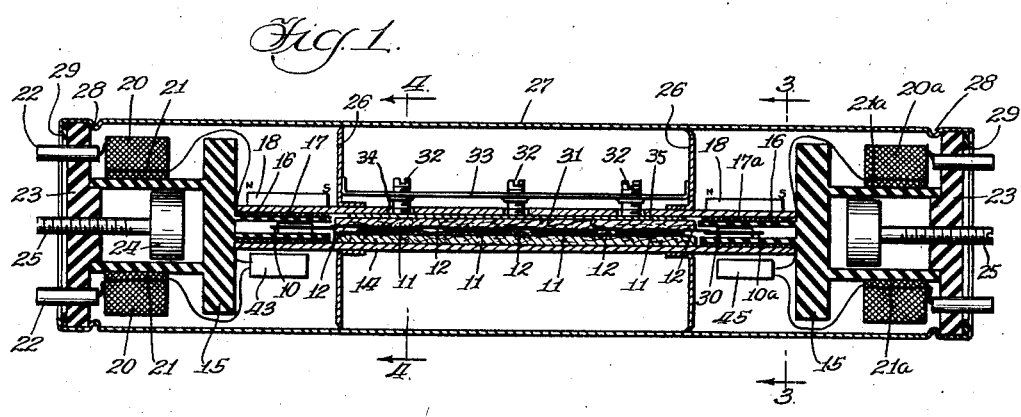
Fig. 1 is a cross-sectional view illustrating one embodiment of the filter structure in accordance with the invention.
Figure 2:
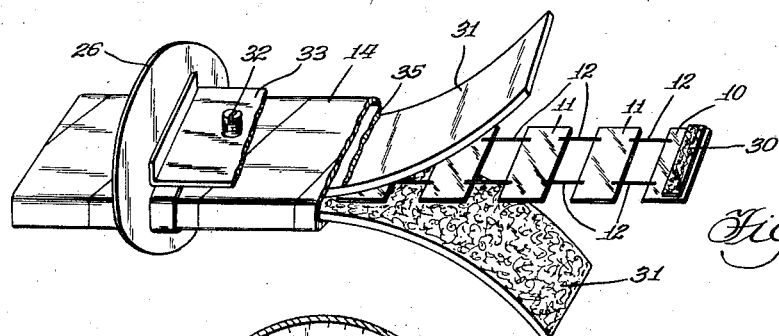
Fig. 2 is a fragmentary detail view illustrating the filter structure.
Figure 4:
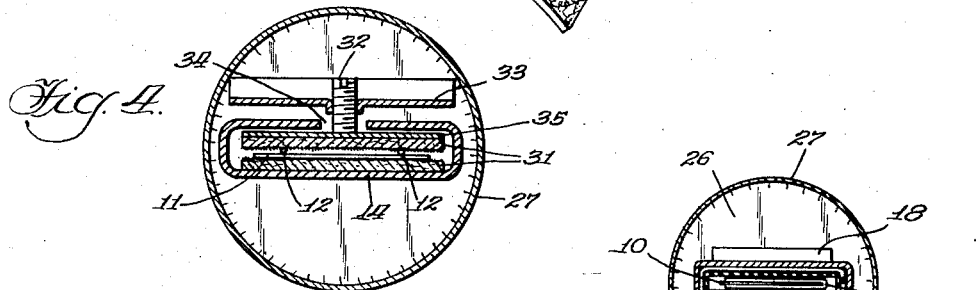
Figs. 3 and 4 are cross-sectional views along the lines of Figs. 3—3 and 4—4 of Fig. 1 respectively.
Figure 3:
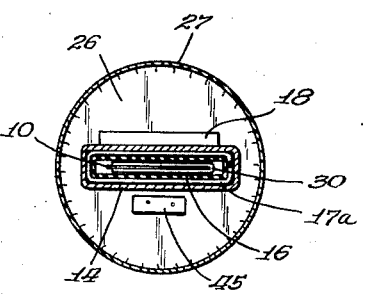

Referring now to the structure of Figs. 1–4 inclusive, the filter structure includes a ladder-like filter unit including plates 10 and 11, and wires 12 welded to the plates. As best seen in Fig. 2, the wires lap over the edge of the plates and are spot welded thereto to form a single ladder unit. The filter unit is enclosed in a tubular housing 14 made of any suitable insulating material and having a rectangular cross-section as best shown in Figs. 3 and 4. The coils for driving the plates and the matching coils therefor are provided on insulating members 15 in the forms of hollow spools with extensions 16 thereon supporting the driving coils 17. The extensions 16 with the coils 17 thereon are positioned within the form 14 and surround the end plates 10 of the filter unit. As previously stated, the end plates 10 of the filter unit are made of magnetostrictive material so that mechanical vibration is produced in response to current in the coils 17. Permanent magnets 18 are positioned adjacent the coils to provide a unidirectional biasing field through the magnetostrictive plates 10.

For coupling the windings 16 in high impedance circuits, matching coils are provided having primary windings 20 and secondary windings 21 wound on the spools or members 15. The secondary winding 21 is connected to the coil 17 and the primary winding 20 is connected to pins 22 for connection to external components. The pins 22 are positioned in the circular end plates 23 of the insulating members 15. Supported within the hollow spools of the members 15 are cores 24 for varying the inductance of the windings 20 and 21 of the matching coils. The cores 24 include stems 25 which are threaded in the end plates 23.

Although the coils 17 have been referred to generally as driving coils, in actual use one of the coils will be a driving coil and the other a pick up coil. The coils will, however, be of identical construction. To clarify further description of the filter, the letter a will be added to the numerals designating the pick up coil and associated components. Therefore, the pick up coil is 17a, the matching windings are 20a and 21a and the filter plate within the pick up coil is 10a. Cylindrical shielding discs 26 are provided about the tubular housing 14 to prevent direct electromagnetic and electrostatic coupling between the driving and pick up coils and the associated matching windings. A tubular shield 27 is provided about the entire assembly and secured to the end plates 23 to form a compact unitary structure. This is accomplished by rolling a rib 28 near the ends of the shield 27 and rolling the ends over against washers 29.

In order to damp out undesired vibrations in the filter, damping means are provided. These include strips of resilient material 30 positioned about the end plates 10 for termination of the filter. Sheets of resilient material 31 are positioned on the two sides of the filter unit in engagement with the plates 11 and the coupling wires 12 to damp out undesired flexural vibrations of the filter unit itself. In order to render manufacture of the filter less critical and to permit accurate adjustment of the response characteristics thereof, adjustable means are provided for varying the pressure exerted by the sheets 31 on the filter components. This is provided by the screws 32 which are adjustably threaded in member 33 connected to the shielding discs 26. The screws extend through openings 34 in the tubular housing 14 and bear on a stiff plate 35 positioned above the top damping sheet 31. The plate 35 therefor applies pressure on the damping sheets which may be controlled along the length of the filter by the adjustment of the individual screws 32. Adjustment of the damping pressure provides variation in the response characteristic as will be fully explained.

Figure 5:
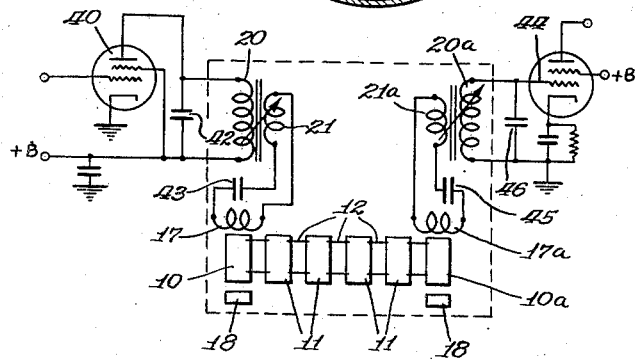
Fig. 5 is a schematic diagram illustrating the use of the filter in an electronic circuit.

The electromechanical filter may be used for selecting particular frequencies in various circuit arrangements. One application in which the filter is particularly applicable is in an intermediate frequency amplifier. Fig. 5 illustrates the use in such a circuit with the tube 40 applying signal energy to the filter, and the filter applying the selected signals to the input electrodes of the tube 41. The tube 40 may be used either as a mixer or an intermediate frequency amplifier and the tube 41 in either case would be an intermediate frequency amplifier. The primary matching winding 20 is resonated by a condenser 42 and applies the signal to a secondary winding 21. The signal is then applied to the driving winding 17 which produces a field reacting with the field of permanent magnet 18 to cause movement of the magnetostrictive plate 10. A condenser 43 is provided for resonating the secondary circuit. Such movement is transmitted in turn through the plates 11 to the plate 10a at the other end of the filter with each of the plates acting to further select the frequency to which they are resonant. Movement of the plate 10a in its magnetic field induces a voltage in the pick up coil 17a which is applied through the windings 21a and 20a of the matching transformer to the grid 44 of the tube 41. A condenser 45 may be provided for series resonating the coil 17a and a condenser 46 may be connected across the winding 20a to resonate the same in a well known manner.

The plates of the filter unit are constructed of such size that the natural frequency of vibration across the width or shortest dimension thereof is at the desired frequency. The driving plates (10 and 10a) must be made of a magnetostrictive material such as nickel and the intermediate plates should be made of material such that the ratio of modulus of elasticity to density is substantially constant through wide temperature variations. Alloys of the Invar type and certain precipitation hardening alloys have been found to be particularly suitable. Such alloys are advantageous as they have sufficient magnetostrictive properties that the resonant frequency of individual plates can be calibrated by driving the plates magnetostrictively. For operation at an intermediate frequency of about 450 kilocycles per second, the dimensions of the plates are approximately .300 inch wide, .200 inch long and .010 inch thick. The coupling wires may be made of material such as tungsten or molybdenum. Both materials have been used satisfactorily. In a structure as shown, tungsten wire having a diameter of about 6 thousandths of an inch, and molybdenum wire of about 7 thousandths, have been found to be suitable.

The tubular housing 14 may be made of any suitable insulating material such as Bakelite impregnated paper. The damping material may be in the form of rubber sheets, with rubber of the silicon and neoprene types being preferable. Various plastic materials are also suitable as are strips of felt or rayon flocking. The plate 35 which applies pressure on the damping sheets may be any stiff material and may be either metal or insulation.

As previously stated, the filter structure may be used as the selective element of an intermediate frequency amplifier. For such use it is desired that the filter pass a definite band of frequencies and attenuate all other frequencies. In other words, the pass band for maximum selectivity should be rectangular with steep sides and a substantially square top. It has been found that such characteristics can be substantially provided by filter structures as illustrated. The band width can be controlled by selecting the impedance of the coupling elements and the plates. Fig. 10 shows curves of such filters with the curve A illustrating the band pass of a lightly damped filter. It will be noted that the band width at the top is about 20 kilocycles and that the band 50 decibels below the top is only slightly more than 40 kilocycles wide. This will provide very high selectivity being as good or better as that attainable by the best electrical filter which would be much larger and more complicated and expensive.

Figure 11:
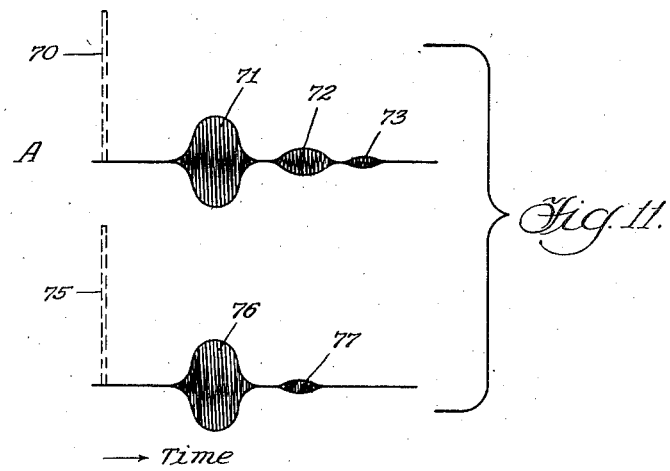
Fig. 11 illustrates the response characteristics of filters of different constructions.

Although a band pass characteristic which is substantially rectangular is required for maximum selectivity, it has been found that when such a filter is used in standard circuits, undesired ringing or continued oscillations may occur. Tests have shown that the ringing response of a filter having a rectangular band pass may be as much as one-half of the main transient response and this will produce undesired oscillations in the circuit. Curve A of Fig. 11 illustrates the response of such a filter when shock excited by a pulse such as would be produced by noise in a communication circuit. The noise pulse is represented at 70, the main transient response at 71 and the ringing response at 72 and 73. It is obvious that ringing responses extending over a long time interval as indicated by 72 and 73 will be objectionable as they might paralyze the communications system for this interval of time. As the ringing responses are frequency modulated, they can not be balanced out in frequency modulation detectors. By rounding the tops of the band pass of the filters, the ratio of ringing response to main transient response can be very greatly reduced. This is indicated by curve B of Fig. 11 in which the pulse 75 produces a main transient response 76 and a ringing response. The ringing response is of lower amplitude and of much shorter duration than in curve A. It has been found that the band pass characteristic of electromechanical filters can be rounded in two principal ways. First, the various plates and couplings of the sections of a filter can be selected so that various sections have different band widths and in this manner the band pass characteristics can be shaped. Such plate and coupling constructions which provide different band widths, will also provide different impedances in the various sections. The second method comprises damping of the filters which lowers the Q and produces detuning. This is entirely analogous to the damping of electrical circuits and changes the effective impedance of the filter sections. Such damping results in phase shift of the various frequencies within the band. It has been found that when the phase shift of the various frequencies within the band is linear with frequency throughout the pass band, the ringing response is very low. Phase shift can be controlled both by damping and by the construction of the various parts of the filter unit.

Figure 12:
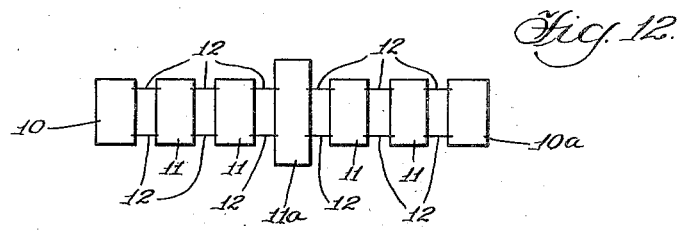
Fig. 12 illustrates a modified filter structure.
Figures 13, 14:
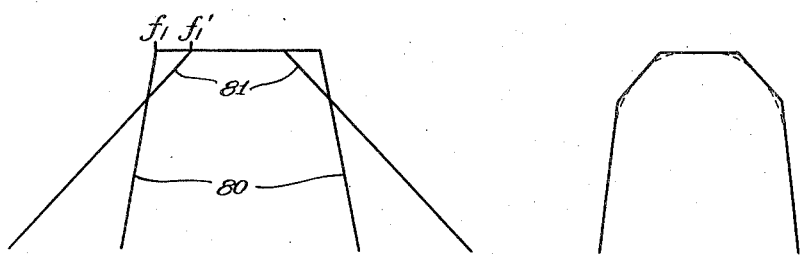
Figs. 13 and 14 illustrate the selectivity of the structure of Fig. 12.

Fig. 12 shows a filter unit in which one section has a different band pass characteristic than the others. The band pass of a plate and associated coupling wires is proportional to the ratio of the impedance of the wires to the impedance of the plate. The impedance of the plates and wires is in turn proportional to the cross sectional area thereof. In Fig. 12 the coupling wires 12 may all be identical and the plate 11a has a greater cross sectional area than that of the plates 11 so that the band pass of the section including the plate 11a will be narrower than that of the other sections. This is illustrated in Fig. 13 in which the curve 80 indicates the band pass characteristic of any of the plates 11 and curve 81 indicates the band pass characteristic of the plate 11a. When combined in a filter as illustrated in Fig. 12, the overall response is as indicated in Fig. 14. To provide such a response the band pass of the section including section 11a must be centered with respect to the band pass of the other sections. This is accomplished by constructing the plate 11a so that the lower cut off frequency $f_1'$ differs from the lower cut off frequency $f_1$ of the plate 11 by one-half the difference in the band widths of the different sections.

Figure 15:
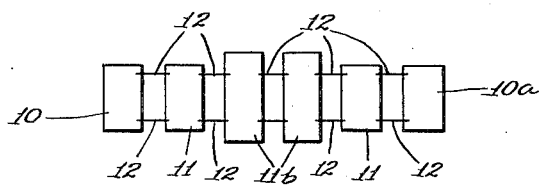
Fig. 15 illustrates still another filter structure.

The rounded band pass characteristic as indicated by the curve of Fig. 14 will have a low ratio of ringing response to main transient response. A very small amount of damping will then produce a smoothly rounded curve as indicated by the dotted lines. Various other constructions can be used to shape the band pass characteristics. One example is illustrated in Fig. 15 in which two narrow band pass sections 116 are combined with two wider band pass sections 11. Other combinations can be used with the sections having different band widths to provide any degree of shaping required. A simple arrangement as illustrated in Figs. 12, 13 and 14 provides very desirable results however.

As previously stated rounding of the band pass characteristic can be obtained by simple damping of the plates and coupling wires. Curve B of Fig. 10 illustrates the pass band of a filter damped to produce minimum ringing response. In tests made, the minimum ringing response may be reduced to as little as $\frac{1}{14}$ of the main transient response. It is to be noted that curve B in other respects is very similar to curve A and the sides are sufficiently steep. The damping does, of course, increase the insertion loss of the filter somewhat. Curve C of Figure 10 shows the filter still further damped so that the top is quite smoothly rounded. However, such heavy damping results in large insertion losses so that the ratio of the ringing response to the main transient response may actually increase with increased damping. Also the loss of selectivity because of increased damping increases the duration of the main transient response. Curve C indicates a filter in which the ringing response is of the order of $\frac{1}{8}$ of the main transient response. It is to be pointed out that filters damped to a more or less extent than that indicated by curve B will give satisfactory results. It has been found that when the ringing response is of the order of $\frac{1}{10}$ or less of the main transient response, the ringing has no serious consequences. The amount of damping produced by damping sheets, as shown in Figs. 1-4, depends upon the area of contact between the damping sheets and the plates and the pressure exerted by the damping sheets. In a structure as shown in Figs. 1-4, the pressure can be varied by the screws 32 and can be adjusted along the length of the filter to provide the results desired.

In Figs. 6 and 7 there is illustrated a modified structure which may be used for the lower damping sheet. In these figures, the sheet is in the form of a molded rubber pad 50 having raised ridges 51 which engage the coupling wires 12. This provides additional engagement between the damping material and the coupling wires to provide increased damping. The top damping sheet may be flat, as shown in Figs. 1–4.

In Figs. 8 and 9 there is illustrated a still further modified structure. In this structure the filter unit including the plates and coupling wires may be identical to that of Figs. 1–4. However, the filter unit is supported in a molded channel member 60 which takes the place of the tubular housing 14 of Fig. 1. The drive coil 17 and pick up coil 17a are supported on the ends of the channel and the permanent magnets 18 may be supported directly on the coils. This structure is adapted to be used with liquid damping with the liquid damping material 61 being contained in the channel of the member 60. A closure plate 62 and a combined supporting and shielding structure 63 are provided, being secured to the channel 60 by rivets 64. The shielding structure 63 includes a central portion extending along the channel and end portions 65 extending perpendicular to the filter unit and forming shields between the matching windings 20, 21 and 20a, 21a. These portions are shaped to cover substantially the entire cross-sectional area of the outer shield 27. The matching windings may be mounted on the insulating spools 66 which are generally equivalent to the members 15 of Fig. 1, but are of such construction that they can be secured to the end portions 65. The end portions 65 may have openings 67 therein into which the tubular portion 68 of the members 66 extend for securing the members to the shield.

The outer shield 27 may be identical to that of Fig. 1, and forms a housing for the entire filter structure. The insulating end members 66 are secured in the tubular housing by the rolled ribs 28 and the turned over ends which bear against the washers 29 in exactly the same manner as in Fig. 1.

When using liquid damping, as illustrated in Figs. 8 and 9, various materials having relatively high viscosity such as grease, silicon compound and polybutene may be used. To provide a large amount of damping, materials that introduce large losses should be used. It is also desirable that the characteristics of the damping material remain constant through a wide temperature range so that the filter will not be affected by changes in temperature. The amount of damping depends upon the contact area, as with solid damping, and also upon the characteristics of the damping liquid. Therefore, by proper selection of damping materials and by controlling the amount of material used, the damping can be controlled. Curves similar to those illustrated in Fig. 10 were obtained using liquid material for damping to indicate that the use of liquid and solid damping materials are equivalent.

It is seen from the above that there is provided a filter structure which is suitable for use as a frequency selective element and which is of very compact construction. In the units disclosed, the outer shielding tube or housing is 3/4 of an inch in diameter and about 3 inches long. Electrical filters having highly selective characteristics would require more than ten times this amount of space and would be much more expensive. The construction of the filters are such that they can be produced in large quantities by production line methods. The band pass characteristics can be shaped to reduce the ringing response without introducing material losses. Control of the band pass characteristics by damping, which is possible in the structures shown, makes it possible to control the ringing response so that it is held within satisfactory limits and permits adjustments after the unit is assembled.

While certain embodiments of the invention have been described which are illustrative thereof, it is obvious that various changes and modifications can be made therein without departing from the intended scope of the invention as defined in the appended claims.

We claim:

1. An electromechanical filter comprising a plurality of sections each including a flat plate and means connected to at least one edge of the plate thereof for mechanically coupling said plate to at least one other plate, said plates transmitting vibrations therethrough and said coupling means applying said vibrations from one plate to the next, one of said sections including a plate of different configuration than the plate of another section so that the band pass of said one section is different than the band pass of said other section.

2. An electromechanical filter comprising a plurality of sections each including a thin flat plate and wires connected to the edge of said plate for transmitting motion between said plate and at least one other plate, said plates transmitting vibrations therethrough from one edge to another edge, said wires connected to all said plates being substantially identical and said plates being of such configuration that the mechanical resonant frequencies thereof are substantially the same and the impedances thereof differ so that the bands passed by the various sections differ.

3. An electromechanical filter comprising a plurality of sections each including a flat plate and coupling means connected to an edge of said plate so that each of said sections forms a band pass filter for selectively transmitting vibrations therethrough, the plate and coupling means of one section being so constructed that the band pass of said one section is of less width than that of the other sections and the center frequency of the band pass of all said sections is substantially the same, said sections having such impedance that the phase shift applied thereby to vibrations transmitted therethrough varies substantially linearly with frequency within the band pass of the filter.

4. An electromechanical filter including in combination, a plurality of thin plates having substantially parallel edges, means connected to said edges of said plates for transmitting motion from one plate to another, said plates being of such configurations that the mechanical resonant frequencies thereof are substantially the same and the impedences thereof are different so that the band pass of the various plates are different, and damping means engaging said plates for altering the effective impedence thereof so that the phase shift of vibrations transmitted through said filter varies substantially linearly with frequency.

5. An electromechanical filter including including in combination, a plurality of thin plates having substantially parallel edges, damping means engaging said plates for preventing flexural vibrations thereof, and means connected to said edges of said plates for transmitting motion from one plate to another, said plates having substantially the same lengths between said parallel edges so that the mechanical resonant frequencies thereof are substantially the same, and having different cross sections so that the impedances thereof and the band pass provided thereby are different.

6. An electromechanical filter including in combination, a plurality of thin flat plates having substantially parallel edges, means supporting said plates for vibration so that vibrations are transmitted therethrough from one of said edges to the opposite edge, and mechanical connecting means coupling said plates for transmitting vibrations from one plate to another, said connecting means being secured to each plate along at least one edge thereof and having relatively small cross section as compared to the cross section of said plates, said supporting means including damping means engaging said plates for altering the effective impedance thereof, said plates having such dimensions that the resulting effective impedance thereof including the effect thereon of said damping means produces phase shift of the vibrations transmitted through said plates which varies substantially linearly with frequency, said damping means including a sheet of resilient material having projecting ribs thereon positioned to engage said mechanical connecting means in spaces between said plates.

7. An electromechanical filter in accordance with claim 4 in which said damping means is a liquid having relatively high viscosity.

8. An electromechanical filter in accordance with claim 4 in which said damping means includes sheets of resilient material engaging said plates and said connecting means, and means for adjusting the pressure exerted by said sheets.

9. An electromechanical filter structure including in combination, a mechanical filter unit having a plurality of flat rectangular plates adapted to transmit vibrations therethrough from one edge thereof to the opposite parallel edge, and mechanical means secured to at least one edge of each of said plates and coupling said plates in a series, a driving coil about the plate at one end of said unit and a pickup coil about the plate at the other end of said unit, an elongated conducting tubular housing about said unit, end members closing the ends of said tubular housing providing a completely enclosed structure, a pair of conducting discs positioned between said driving coil and said pickup coil having openings for receiving said filter unt therethrough and edges engagng said conducting housing, and damping means engaging the sides of said plates for preventing flexural vibrations thereof, said conducting discs supporting said filter unit and said damping means from said housing, said conducting disc and said conducting housing preventing direct electromagnetic and electrostatic coupling between said driving coil and said pickup coil.

MYRON L. ANTHONY.
ROBERT M. VIRKUS.

References Cited in the file of this patent
UNITED STATES PATENTS

| Number | Name | Date |
| --- | --- | --- |
| 1,678,116 | Harrison | July 24, 1928 |
| 1,892,554 | Kellogg | Dec. 27, 1932 |
| 2,318,417 | Phelps | May 4, 1943 |
| 2,445,762 | Chanal | July 27, 1948 |
| 2,455,740 | Curtis | Dec. 7, 1948 |
| 2,501,488 | Adler | Mar. 21, 1950 |